(12) United States Patent
Morris et al.

(10) Patent No.: US 10,445,056 B1
(45) Date of Patent: Oct. 15, 2019

(54) SYSTEM FOR DELIVERABLES VERSIONING IN AUDIO MASTERING

(71) Applicant: Disney Enterprises, Inc., Burbank, CA (US)

(72) Inventors: Stephen Morris, Burbank, CA (US); Scott Levine, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/026,380

(22) Filed: Jul. 3, 2018

(51) Int. Cl.
*G06F 3/16* (2006.01)

(52) U.S. Cl.
CPC ..................... *G06F 3/165* (2013.01)

(58) Field of Classification Search
CPC ........... G06F 3/16; G06F 17/28; G06F 17/289
USPC ................ 700/94; 381/303, 61, 56; 704/500
See application file for complete search history.

(56) References Cited

U.S. PATENT DOCUMENTS

| | | | | |
|---|---|---|---|---|
| 2012/0290621 | A1* | 11/2012 | Heitz, III ............... | G06F 16/683 707/780 |
| 2015/0003812 | A1* | 1/2015 | Soroka ............... | H04N 21/8547 386/285 |
| 2016/0021476 | A1* | 1/2016 | Robinson ................ | H04S 3/008 381/303 |

* cited by examiner

*Primary Examiner* — Melur Ramakrishnaiah
(74) *Attorney, Agent, or Firm* — Sheppard Mullin Richter & Hampton LLP

(57) ABSTRACT

Implementations of the disclosure describe systems and methods that leverage machine learning to automate the process of creating various versions of sound mixes using an original sound mix as a starting point. In implementations, a system for automated versioning of sound mixes may include: (i) a component to extract metadata categorizing/identifying the input sound mix; (ii) a component to extract audio features of the input sound mix; (iii) a component that uses a machine learning model to compare the extracted audio features of the input sound mix with extracted audio features of previously analyzed sound mixes to calculate audio features of a target sound mix; and (iv) a component to perform signal processing to derive the target sound mix given the calculated audio features.

21 Claims, 8 Drawing Sheets

SYSTEM FOR DELIVERABLES VERSIONING IN AUDIO MASTERING

BRIEF SUMMARY OF THE DISCLOSURE

Implementations of the disclosure describe systems and methods that leverage machine learning to automate the process of creating various versions of sound mixes using an original sound mix as a starting point.

In one example, a method includes: receiving a first version of a sound mix; extracting metadata from the first version of the sound mix, where the extracted metadata categorizes the first version of the sound mix; extracting audio feature data from the first version of the sound mix; automatically calculating, with a trained model, audio feature data of a second version of the sound mix using at least the extracted metadata and the extracted audio feature data of the first sound mix; and deriving the second version of the sound mix using at least the calculated audio feature data. In implementations, the extracted audio feature data of the first version of the sound mix comprises one or more of: audio levels, audio spectral balance, audio spatial balance, and audio content identities.

In implementations, the extracted metadata identifies one or more of the following categories: a production studio, a genre, a filmmaker, a type of media content, a sound designer, a re-recording mixer, and a sound format of the first version of the sound mix.

In implementations, automatically calculating, with a trained model, audio feature data of a second version of the sound mix, includes: selecting the trained model from a plurality of trained models based on at least a category of the first version of the sound mix identified from the extracted metadata.

In implementations, the first version of the sound mix is an original sound mix created for a television or film production, where the original sound mix comprises a dialogue stem or submix, a music stem or submix, and a sound effects stem or submix, and where the second version of the sound mix comprises a dialogue stem or submix, a music stem or submix, and a sound effects stem or submix. For example, for the original sound mix, the dialogue stem, music stem, and sound effects stem may be separately processed prior to combining them together to form the original sound mix. When forming the second version of the sound mix, each of the dialogue stem, music stem, and sound effects stem may be separately processed and/or modified to a form a new dialogue stem, music stem, and sound effects stem for the second version of the sound mix.

In implementations, automatically calculating audio feature data of the second version of the sound mix includes: the trained model using at least an audio format of the first version of the sound mix and a desired audio format of the second version of the sound mix to map one or more of the audio levels, audio spectral balance, audio spatial balance, and audio content identities of the first sound mix to a respective one or more of an audio level, audio spectral balance, audio spatial balance, and audio content identity of the second sound mix.

In implementations, deriving the second version of the sound mix includes: using at least the calculated audio feature data of the second version of the sound mix to adjust one or more of the audio levels, audio spectral balance, audio spatial balance, and audio content identities of the first version of the sound mix.

In implementations, the method further includes: creating the trained model, wherein creating the trained model comprises: using a plurality of previously created sound mixes to create a first dataset comprising extracted metadata and extracted audio feature data for each of the previously created sound mixes; dividing the first dataset into a training dataset and a testing dataset, where each of the training dataset and testing dataset includes a plurality of sound mix groups, each of the plurality of sound mix groups including extracted metadata and audio feature data of an original sound mix and derivative sound mixes derived from the original sound mix; training the model using the training dataset, wherein the model is trained using at least a supervised learning algorithm that correlates an audio feature of an original sound mix with an audio feature of a derivative sound mix; and testing the model using the testing dataset.

In implementations, the method further includes: ingesting audio features of the first and second versions of the sound mix into an audio features library to further train the learned model.

In implementations, the method further includes: applying additional processing to the derived second version of the sound mix to comply with technical version digital file specifications.

In one example, the aforementioned method may be implemented by a processor executing machine readable instructions stored on a non-transitory computer-readable medium.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
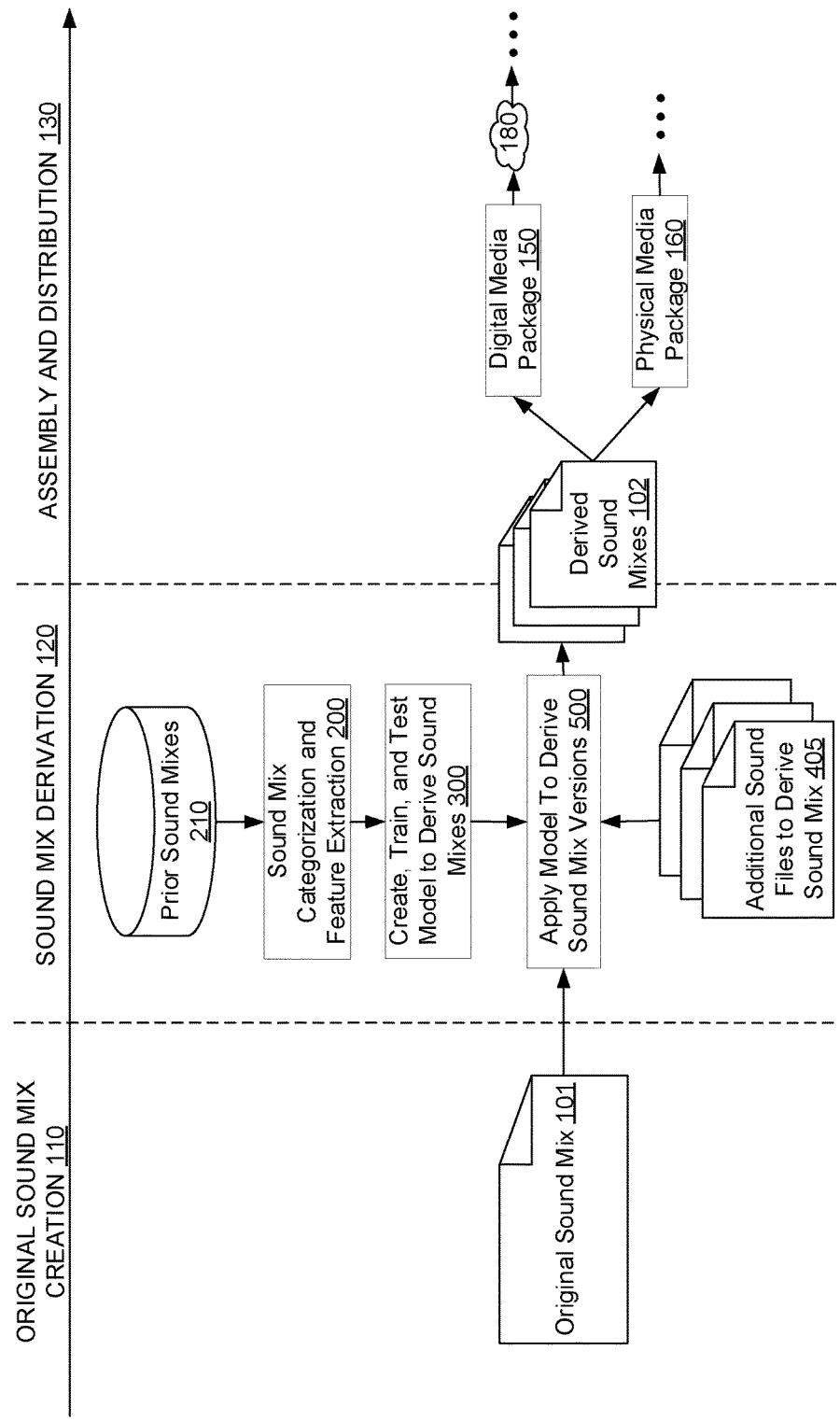
FIG. 1 illustrates a process flow for creating and distributing sound mixes, in accordance with implementations of the disclosure.

The figures are not exhaustive and do not limit the disclosure to the precise form disclosed.

DETAILED DESCRIPTION

After production of media content such as a movie, television show, or television/episodic series, or other media production including an aural component, many different versions of sound mixes may need to be created for the media content to account for various distribution channels. For an original movie sound mix (e.g., mix of dialogue, music, and sound effects) that is created in English in a DOLBY ATMOS theater format, derivative sound mixes may need to be created in other formats (e.g., DOLBY ATMOS home, 5.1 surround sound, 7.1 surround sound, DTS-HD, Stereo, Binaural, etc.), other languages (e.g., Spanish, Mandarin, Cantonese, etc.), for physical or digital media distribution, or some combination thereof.

For example, consider a final sound mix of an animated film that is initially released to theaters. After the film's release to theaters, the sound mix may be made available on different digital media streaming services (e.g., AMAZON, NETFLIX, MOVIES ANYWHERE) and physical media (e.g., BLU-RAY disc). In such a scenario, it may not be sufficient to repurpose a theater sound mix for a home speaker system because the home speaker system will perform much differently (e.g., different frequency response for different frequency ranges, different sensitivity, fewer number of speakers, etc.) As such, the original sound mix may need to modified to create a derivative sound mix that is suitable for a particular playback format and/or a particular set of speakers (e.g., typical home speakers, or speakers built into a device).

Presently, the creation of different versions of a sound mix that comply with multiple distribution specifications is primarily a manual process that entails real-time, manual mix adjustments and processing. For example, a re-recording mixer may be tasked with conforming the soundtrack to given specifications while maintaining original sonic characteristic approved by filmmakers. As part of this task, the rerecording mixer may need to consider technical specifications such as frame rates, sampling rates, territory (e.g., language), destination format (e.g., broadcast, home theater, over-the-top (OTT)), audio playback format (e.g., ATMOS, 7.1, 5.1, stereo, mono, etc.), broadcast chain limitations (e.g., operating levels, energy saturation), audio band spectral balance (e.g., mixed for mobile v. theater), loudness (e.g., playback capabilities of different devices and optimal levels), etc. Such an individual may spend many days in a small studio room listening to different speaker system configurations on different loudness settings to determine, for example, if human dialogue is understandable when movie sound effects and/or music are loud.

With the growing quantity of required versions of sound mixes, multiple problems are presented by current techniques for creating different sound mixes. One problem presented by current techniques is that although many required versions are created via technical transfer, current tools only allow for manual manipulation with human input. A second problem is that the time available for creative collaboration between sound mixers and filmmakers has been reduced due to reduced production timelines. A third problem is that multiple quality control passes by the same human listener introduces the potential for missed and/or false positive error recognition. A fourth problem is that the configurations of sound equipment necessary to produce each possible version of a sound mix for testing is becoming more costly. A further problem is that it is not feasible to predict every potential destination format for a sound mix, particularly with the rising trend of audience-personalized experiences.

Implementations of the disclosure are directed to addressing these and other problems that arise in present systems and methods for creating sound mixes. To this end, the disclosure is directed to systems and methods that may leverage machine learning to automate the process of creating various versions of sound mixes using an original sound mix as a starting point. In accordance with implementations further described herein, a system for automated versioning of sound mixes may include (i) a component to extract metadata categorizing/identifying the input sound mix; (ii) a component to extract audio features of the input sound mix; (iii) a component that uses a machine learning model to compare the extracted audio features of the input sound mix with extracted audio features of previously analyzed sound mixes to calculate audio features of a target sound mix; and (iv) a component to perform signal processing to derive the target sound mix given the calculated audio features. Further implementations of the system described herein may include a component that uses the derived target sound mix and input sound mix to perform additional training of the model.

By virtue of automating the process of sound mix creation and leveraging machine learning to create a model of sound mix creation that continuously improves, various advantages may be realized. First, the automation of the sound mix versioning process may increase time available for creative collaboration between sound mixers and filmmakers. Second, the use of a continually learning model may be used to generate the best possible version of derivative sound mixes over time. Further, the systems and methods described herein may allow for movement of a versioned sound mix creation process into a head end of a distribution channel (e.g., a streaming service could derive any version of a mix given an original mix). These and other advantages that may be realized from implementing the systems and methods described may be further appreciated from the disclosure.

FIG. 1 illustrates a process flow for creating and distributing sound mixes in accordance with the disclosure. At process 110, an original sound mix 101 is created. The original sound mix 101 may be the first sound mix created for a film (e.g., sound mix for theater release), a television show, a television series, or other media production including an aural component. The sounds of sound mix 101 may be directly captured (e.g., using a microphone), digitally created (e.g., using sound generation software), and/or edited prior to media production (e.g., prior to filming), during media production (e.g., during filming), and/or after media production (e.g., after filming/during post-production). The created sound mix 101 may be created as either a single combined mix, or as a multiple stem mix. Multiple stems (e.g., submixes), when combined, create the composite sound mix. For example, in the case of a film, a stem sound mix may comprise separate stems for dialogue, music, and sound effects. In some cases, additional stems (e.g., separate stems for each voiced character) may be utilized. The stems are the final creative version of this particular format of the mix in that the elements of dialogue, music, and sound effects are unlikely to change. With adjustments, all other versions may be derived from them as further described below.

Following creation of original sound mix 101, a plurality of sound mixes 102 may be derived by implementing a sound mix derivation process 120 that leverages a machine learning model to automate the process of deriving sound mixes 102 given an original sound mix 101. As further described below, the machine learning model may be configured for use by accessing one or more databases 210 containing a record of original and derived sound mixes, extracting and categorizing features from the prior sound mixes (step 200), and creating, training, and testing a model that derives sound mixes with an acceptable accuracy (step 300).

Once the machine learning model is configured, it may be applied to an original sound mix 101 to derive sound mixes 102 (step 500). In addition to the original sound mix 101, additional sound files 405 may be provided as inputs during step 500 to derive sound mixes 102. For example, in the case of an original sound mix 101 that is in an English language and derived sound mixes 102 that are distributed to regions (e.g., countries) where English is not the native language, additional sound files 405 may comprise a dialogue stem in the native language of the region.

Following derivation of sound mixes 102, at step 130, the derived sound mixes may be assembled into a media package for distribution. For example, one or more derived sound mixes 102 may be assembled and synchronized with video for distribution.

In some implementations, the derived sound mixes 102 may be distributed as part of a digital media package 150 over a communication medium 180. Communication medium 180 may use one or more suitable communication methods for delivering the digital media package 150, including, for example, satellite communications, cellular communications, fiberoptic cable communications, coaxial cable communications, free space optical communications, or some combination thereof.

For example, a digital media package 150 may be streamed or downloaded over a content delivery network including file servers for storing instances of digital media package 150 and web servers for delivering the stored instances of package 150. As another example, digital media package 150 may be distributed as digital cinema files to a theater over a communication network. After ingesting the digital media 150, a theater may then present it in an auditorium. In digital media distribution implementations where a derived sound mix 102 is in accordance with the Digital Cinema Initiatives, LLC (DCI) Specification, for instance, the sound mix 102 may comprise digital audio track files that are assembled into a digital content package (DCP) including the audio track files, image track files, and a composition playlist including a time code index specifying the order and playback times of the track files.

In some implementations, the derived sound mixes 102 may be distributed as part of a physical media package 160. For example, one or more derived sound mixes 102 may be stored on an optical disc (e.g., BLU-RAY disc), a flash drive, or other physical media drive that may store media content including a derived sound mix 102.

Figure 2:
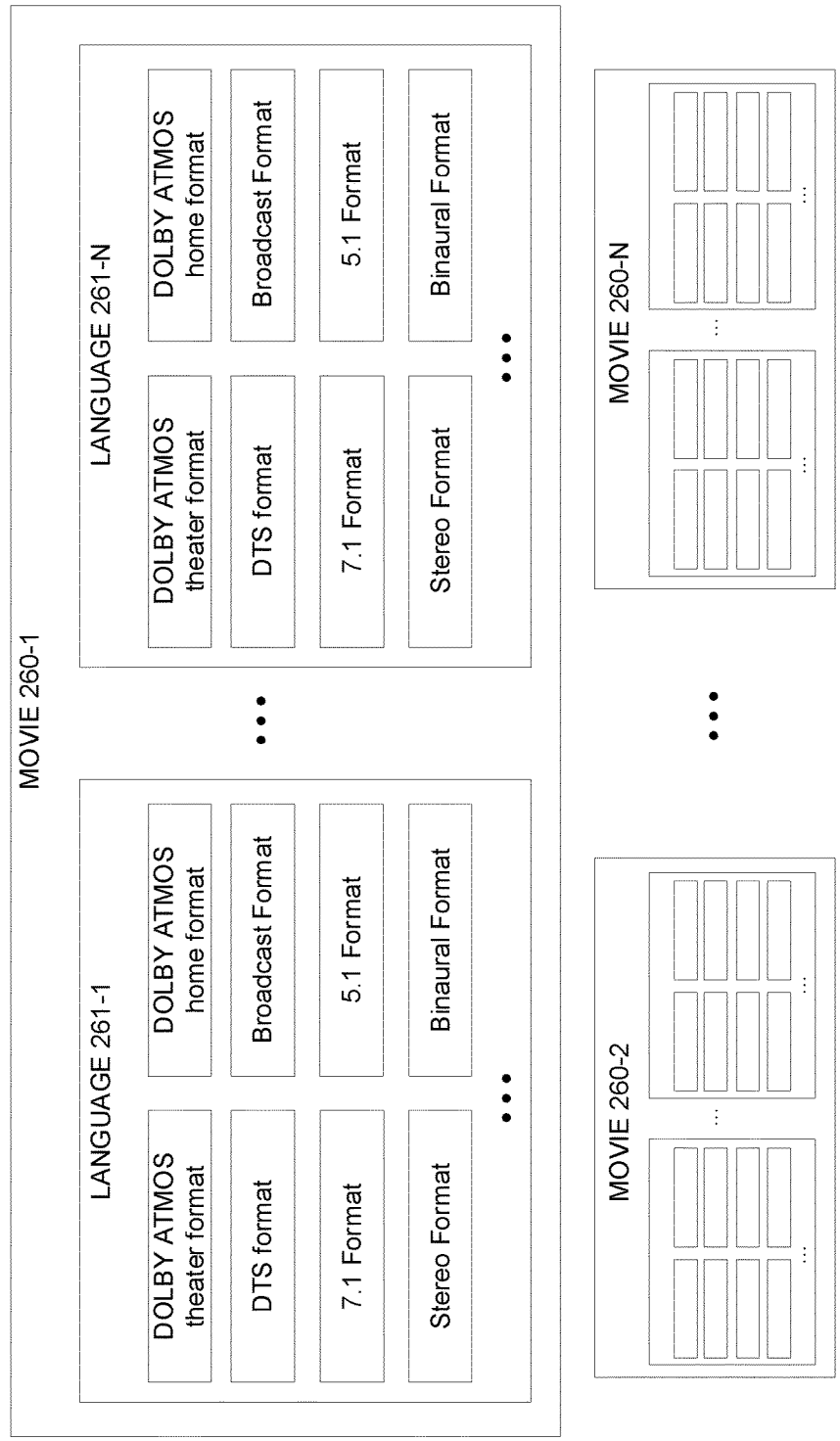
FIG. 2 illustrates an example record of sound mixes for movies that may be stored in one or more databases.

As noted above, in various implementations, one or more databases 210 containing a prior record of sound mix versions for different media content items (e.g., various sound mix versions for different movies and/or television shows) may be leveraged to build a model for automatically deriving a sound mix 102 given an original or input sound mix 101. For example, a producer or distributor may leverage decades of soundtracks that have been produced for films and/or television series. FIG. 2 illustrates an example record of sound mixes for movies 260-1 to 260-N (individually referred to as a movie 260) that may be stored in one or more databases 210. For a given movie 260, sound mix versions may be created for various languages 261-1 to 261-N (individually referred to as a language 261). For a given language 261, a sound mix version may have been created in each of a DOLBY ATMOS theater format, a DOLBY ATMOS home format, a DTS format, a broadcast format, a 7.1 Format, a 5.1 Format, a Stereo format, a Binaural format, or some other suitable audio format.

Figure 3:
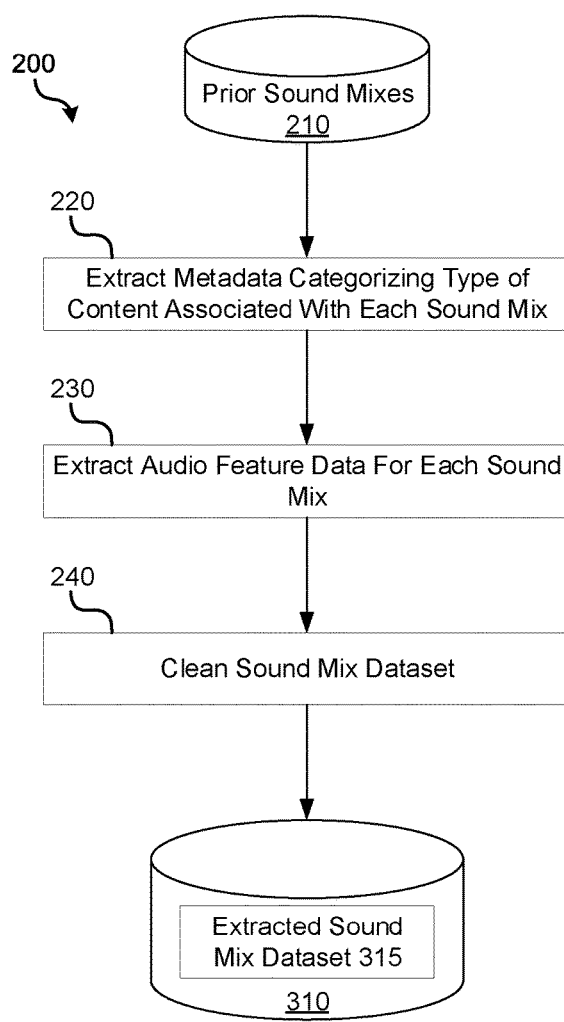
FIG. 3 is an operational flow diagram illustrating an example method for leveraging a record of previously created sound mixes for sound mix categorization and feature extraction, in accordance with implementations of the disclosure.

FIG. 3 is an operational flow diagram illustrating an example method 200 for leveraging databases 210 for sound mix categorization and feature extraction, in accordance with implementations of the disclosure. At operation 220, metadata categorizing the type of content associated with each sound mix may be extracted. For example, metadata may be extracted that identifies a production studio, a genre, a filmmaker, a type of media content (e.g., feature film, animation film, short, teaser, television episode, VR content, etc.), a sound designer, a re-recording mixer, or other feature of the content associated with the sound mix. Additionally, at operation 220, metadata categorizing the type/format of the sound mix (e.g., DOLBY ATMOS theater, DOLBY ATMOS home, 5.1, 7.1, Stereo, Binaural, etc.) may be extracted. Further, at operation 220, metadata categorizing whether the sound mix is the original/parent sound mix or a derivative sound mix may be extracted. As further described below, relevant metadata categorizing each sound mix may be used to classify each sound mix such that it is compared with other sound mixes having similar audio features. In some implementations, the metadata may be extracted from a digital media package 150 including the sound mix.

In implementations, metadata may be extracted via the use of an accompanying sidecar descriptive metadata file, from data contained within the header of the digital audio files of the sound mix, and/or from an embedded digital token/watermark.

At operation 230, audio feature data identifying the audio characteristics of each sound mix may be extracted for each sound mix version of each media content item. As further described below, relevant audio feature data of each original sound mix may be compared against corresponding audio feature data of derived sound mixes to create a model that calculates audio features of a derived sound mix given known audio features of an original sound mix. For example, given the audio features of an original sound mix in an DOLBY ATMOS theater format, audio features in a DOLBY ATMOS home format may be calculated and used to generate the derivative sound mix.

In implementations, one or more of the following categories of audio feature data may be extracted for each sound mix (e.g., originals and derivatives for each media production): (i) audio levels; (ii) audio spectral balance (e.g., frequency balance); (iii) audio spatial balance; and (iv) audio content identities. While four illustrative categories of audio feature data that may be extracted are described herein, it should be appreciated that other categories/types of audio feature data may be extracted.

For audio levels of a given sound mix, one or more of the following subcategories of audio level data may be extracted: short term (momentary) and long term loudness (e.g., loudness, k-weighted, relative to full scale (LKFS)), loudness or dynamic range (LRA), relative loudness of each program element (e.g., dialogue versus music), peak levels in decibels relative to full scale (dbFS), and immersive soundfield loudness (e.g., perceived listener envelopment in LEV). It should be appreciated that the following subcategories of audio level data that may be extracted are illustrative, and that other subcategories of audio level data may be extracted. In some implementations, feature data for audio levels may be extracted by the means of amplitude analysis of digital audio files, referenced over time or individual sample-based.

For audio spectral balance of a given sound mix, one or more of the following subcategories of audio spectral balance data may be extracted: distribution of energy across frequency spectrum measured temporally, relative balance between different audio frequency components (e.g., highs, lows, base, treble, etc.), and spatial distribution of audio spectral energy. It should be appreciated that the following subcategories of audio spectral balance data that may be extracted are illustrative, and that other subcategories of audio spectral balance data may be extracted. In some implementations, data for audio spectral features may be extracted from digital audio files using techniques such as Fast Fourier Transform, Spectrogram generation from bandpass filtering, and Deconvolution.

For audio spatial balance of a given sound mix, one or more of the following subcategories of audio spatial balance data may be extracted: perceived width of sound elements (e.g., apparent source width (ASW)), element group's soundfield usage, correlation of overhead channels to azimuth level. It should be appreciated that the following subcategories of audio spatial balance data that may be extracted are illustrative, and that other subcategories of audio spatial balance data may be extracted. In some implementations, data for audio spatial balance features may be extracted via mathematical analysis of digitally-sampled audio signals using acoustic measurements such as interaural cross-correlation, signal phase comparisons, signal correlation measurements, ambisonic modeling, interaural time difference and interaural intensity difference.

For audio content identities of a given sound mix, one or more of the following subcategories of audio content identities may be extracted: identification of dialogue, cloth (e.g., non-native extraneous noises contained in a dialogue track), international dialogue, special effects vocalizations, scored music, source music, and discrete sound effects. In some implementations, the extracted audio content identities may identify what percentage of the sound mix includes music, what percentage includes dialogue, and/or what percentage includes sound effects. It should be appreciated that the following subcategories of audio content identities that may be extracted are illustrative, and that other subcategories of audio content identities may be extracted. In some implementations, data for audio content identities may be extracted via automatic audio matching, audio fingerprinting, timbral signature database comparison, hidden Markov models, and other machine learning models to predict and identify the digitally-sampled audio signal.

At operation 240, the extracted sound mix metadata and audio feature data may be cleaned or normalized. For example, in some implementations, categories of metadata or audio feature data may be merged into a single feature. As another example, categories of metadata or audio feature data that are less likely to contribute to the aural qualities of a sound mix may be removed or weighted with less priority from the dataset to focus the subsequent machine learning process on training data including key features that are likely to contribute to the aural qualities of a sound mix. In some implementations, categories of metadata or audio feature data may be split into multiple features. It should be noted that cleaning operation 240 may be performed concurrently with operations 220-230 or after operations 220-230.

Following extraction of metadata and audio feature data for each sound mix, the extracted metadata and data may be stored/cataloged in a database/library 310 as an extracted sound mix dataset 315 that may be used to train and test one or more machine learning models used to derive sound mixes from original sound mixes. It should be noted that process 200 may be iterated over time to refine the dataset used to train and test the aforementioned machine learning models. For example, over time it may be discovered that certain categories of metadata (e.g., animated film versus live action film) are more likely to be indicative of the aural qualities of an original sound mix and its derivatives. Further, as new sound mixes (e.g., originals and derivatives) are created and distributed, the extracted sound mix dataset 315 may be expanded. As such, it should be appreciated that the features, categorization, and size of the extracted sound mix dataset 315 may change over time.

Figure 4:
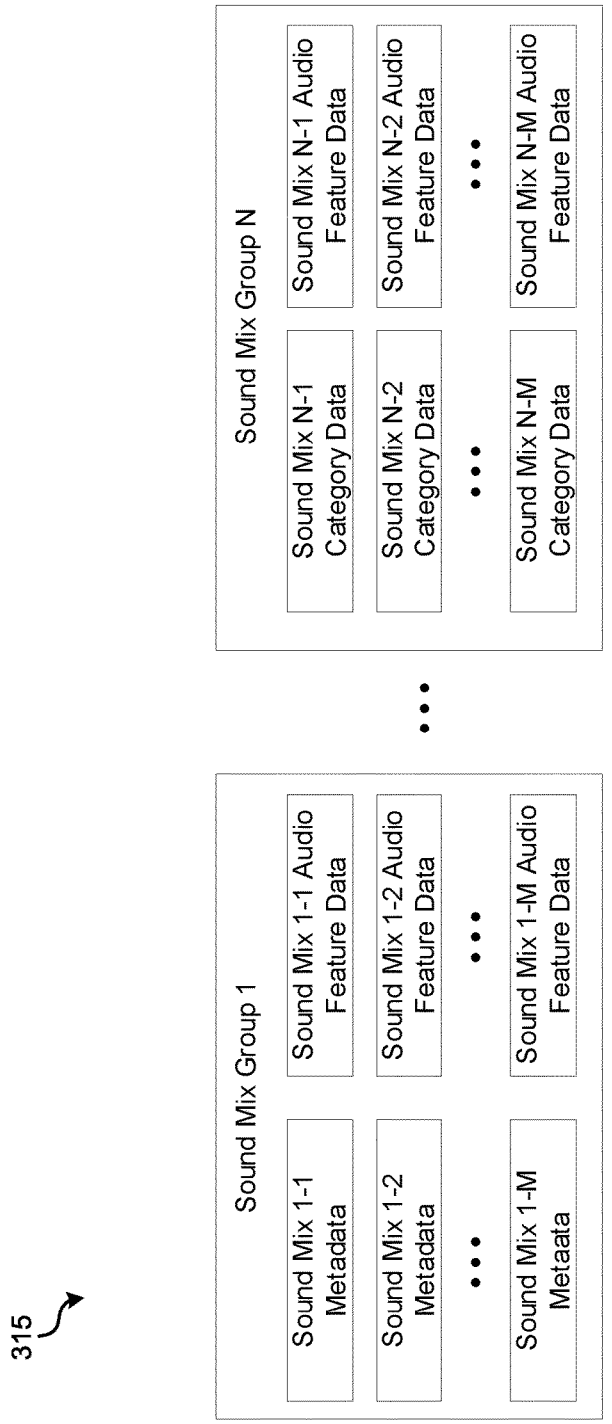
FIG. 4 is a block diagram illustrating a simplified representation of example extracted sound mix dataset, in accordance with implementations of the disclosure.

FIG. 4 is a block diagram illustrating a simplified representation of an example extracted sound mix dataset 315, in accordance with implementations. As illustrated in this example, extracted sound mix data may be grouped into N groups, where each group corresponds to extracted sound mix metadata/audio feature data for a particular media content (e.g., a movie or television show). In the illustrated example, metadata and audio feature data are extracted for M sound mixes for each media work. As noted above, in some instances, the extracted metadata may identify whether a sound mix is an original or derivative. As such, each sound mix group may be further organized into a known input (original sound mix) and known outputs (derivative sound mix(es)).

Figure 5:
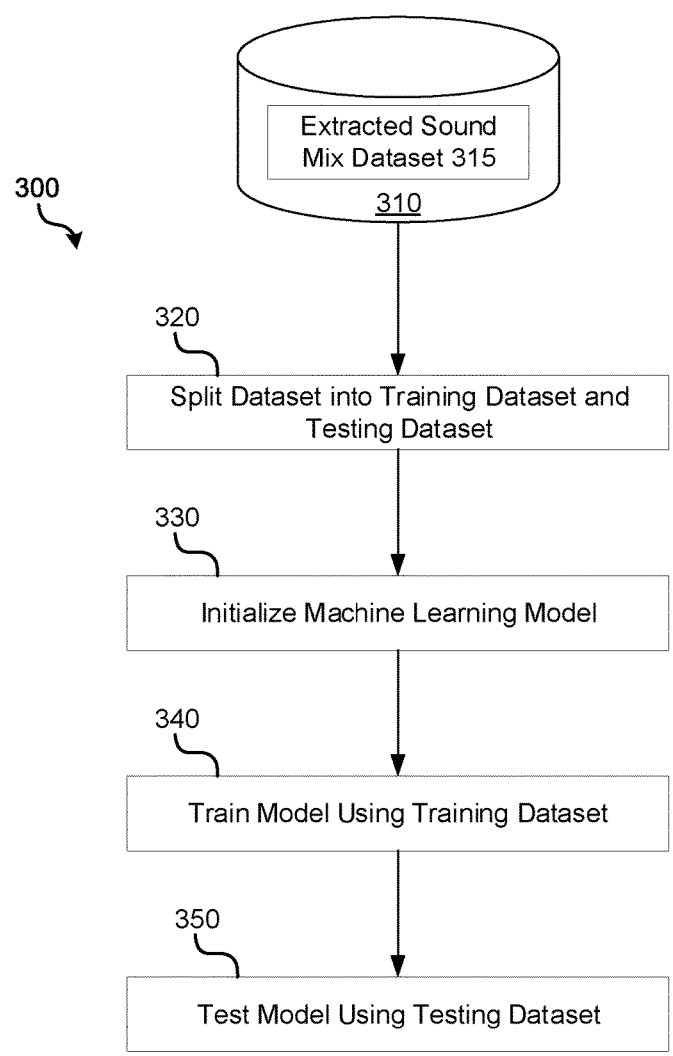
FIG. 5 is an operational flow diagram illustrating an example method for creating, training, and testing one or more models used to derive sound mixes, in accordance with implementations of the disclosure.

FIG. 5 is an operational flow diagram illustrating an example method 300 for creating, training, and testing one or more models used to derive sound mixes, in accordance with implementations of the disclosure. At operation 320, an extracted sound mix dataset 315 stored in a database 310 may be split into a training dataset and testing dataset. In implementations, each of the training dataset and testing dataset may comprise a subset of known sound mix inputs (e.g., original/parent sound mix) and associated outputs (e.g., derivative sound mixes). In implementations, the training dataset may comprise a majority of the dataset (e.g., 60%, 70%, 80%, etc.). In implementations, the datasets may be randomized, prior to splitting, to ensure an equal distribution of patterns of data. Using FIG. 4 as an example, 75% of sound mix groups may be randomly selected to be part of the training dataset, with the remaining 25% being randomly selected to be part of the testing dataset.

At operation 330, a machine learning model may be initialized to perform training using the training dataset. The model may be selected to find patterns/trends between audio feature data of the same sound mix, to find patterns/trends between audio feature data of an original sound mix and a derivative sound mix given a categorization (e.g., metadata) of the sound mixes, and to find other patterns/trends in the audio feature data of sound mixes that may be used to derive a sound mix given an original sound mix as an input.

In implementations, the model may be initialized by selecting one or more supervised learning algorithms that learn patterns using known inputs and known outputs. For example, in some implementations a known input may include an original sound mix metadata and audio features, and a known output may include the metadata and audio features of a derivative sound mix of the original sound mix. As such, relationships between audio feature data of an original sound mix and audio feature data of various derivative sound mixes may be determined. In some implementations, a known input may include a first audio feature data of an sound mix, and a known output may include a second audio feature data of the sound mix.

Supervised learning algorithms such as linear regression, logistic regression, decision trees, k-nearest neighbors, neural networks, and/or support vector machines may be utilized. During initialization, hyperparameters of the algorithms may be set. In some implementations, an ensemble model that combines multiple statistical modeling techniques may be utilized. For example, bagging (averaging of multiple models), a bucket of models (using training data to create different models, and then picking the best one), boosting, stacking, or other ensemble model techniques may be utilized.

In some implementations, unsupervised learning algorithms may be utilized to initialize the model. For example, k-means clustering, principal and independent component analysis, association rules, or other suitable unsupervised learning algorithms may be used. In some implementations, semi-supervised learning algorithms or a combination or supervised and unsupervised learning algorithms may be used.

At operation 340, the model may be trained using the training dataset. For example, using one or more of the aforementioned supervised learning algorithms, a machine may analyze and determine relationships between sound mix metadata and audio feature data in the training data to develop a model that may calculate audio feature data of a derivative sound mix given an input sound mix. For example, given an original sound mix in a DOLBY ATMOS theater format having a particular set of audio characteristics, the model may calculate what the audio characteristics would be for a derivative sound mix having a DOLBY ATMOS home format.

In some implementations, training may be used to identify trends from technical version requests, trends by studio, trends by filmmaker, trends by genre, trends by intended audience, trends for specific recording mixers, and/or other trends.

At operation 350, the model developed during training may be tested using the testing dataset. For example, given an original sound mix of the testing dataset having a particular set of audio feature data, that audio feature data may be provided to the trained model to calculate audio feature data of one or more derivative sound mixes. The audio feature data for each derivative sound mix that is calculated by the model may thereafter be compared with the actual, known audio feature data of the derivative sound mix in the testing dataset to determine a difference (e.g., mean absolute error) between the calculated/predicted audio feature data and actual audio feature data.

In implementations, the performance of the model may be calculated from testing as an average error score for all predictions. If the average error score is too high, additional iterations of method 300 (and optionally, method 200) may be performed. For example, hyperparameters of the algorithms used in the model may be adjusted, the algorithms of the model may be changed, and/or different features of data may be considered in the model.

Alternatively, if the mean absolute error is satisfactory (e.g., the audio feature data of derivative sound mixes calculated by the model is sufficiently close to the actual audio feature data of derivative sound mixes), the model may be made available to create/derive sound mix versions using original sound mixes (e.g., method 500).

In some implementations of method 300, different models may be trained, tested, and/or developed depending on the categorizations of the sound mixes. For example, separate models may be created to derive sound mixes for animated films and live action films. As another example, separate models may be created to derive sound mixes for television series and movies. As further examples, separate models may be created to derive sound mixes for each studio or to derive sound mixes for each genre of content.

In some implementations of method 300, a cross validation process may be performed whereby training and testing data is split into various combinations and trained and tested in these various combinations. For example, an exhaustive cross validation or k-fold validation process may be performed.

Figure 6:
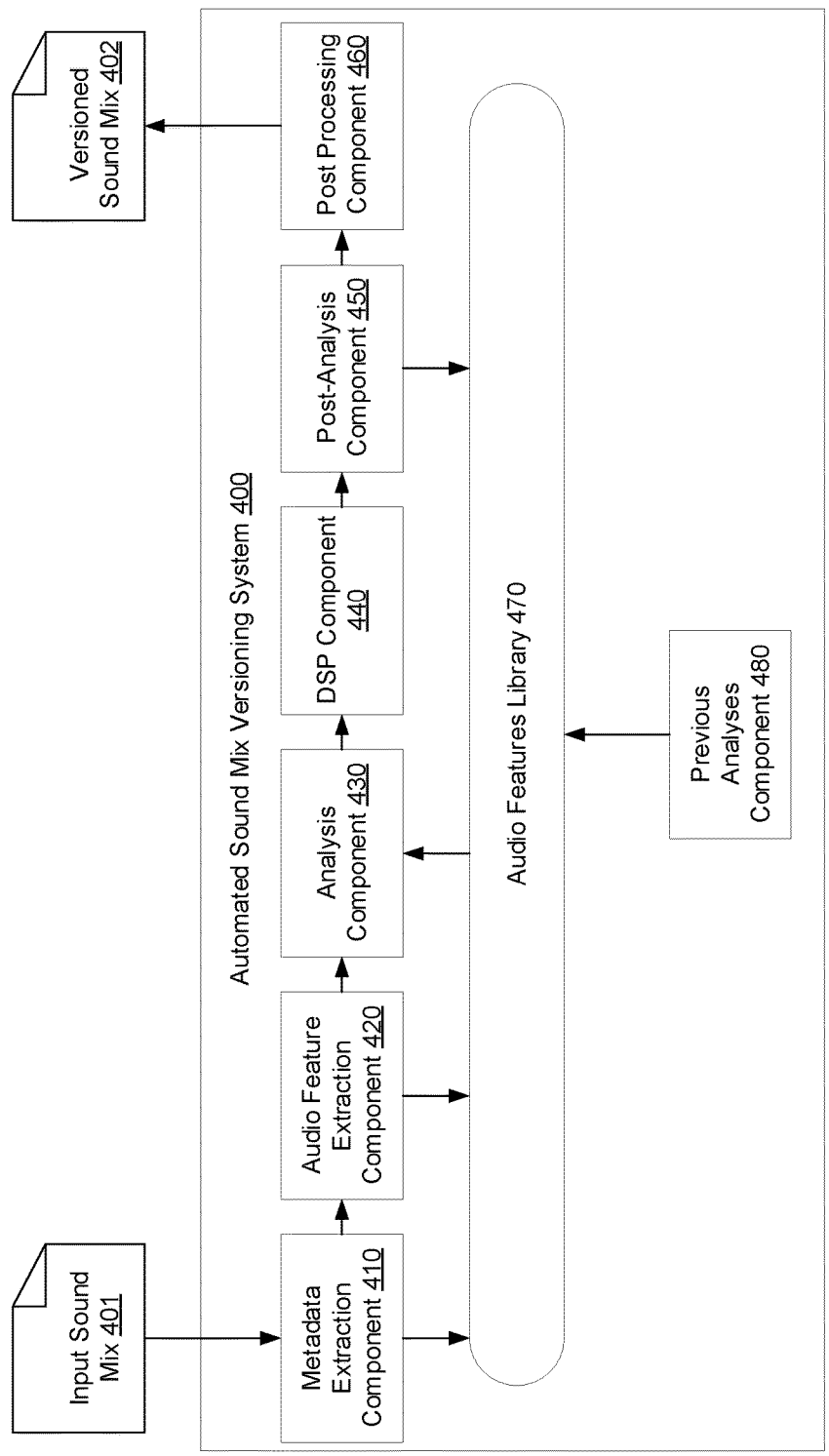
FIG. 6 illustrates an example architecture of components of an automated sound mix versioning system, in accordance with implementations of the disclosure.

FIG. 6 illustrates an example architecture of components of an automated sound mix versioning system 400, in accordance with implementations of the disclosure. System 400 is configured to take as an input an input sound mix 401 (e.g., an original sound mix 101) and output one or more versioned sound mixes 402 (e.g., derived sound mixes 102). For example, system 400 may receive an original stems sound mix of a film having a dialogue stem, a music stem, and a sound effects stem, and output a derivative stems sound mix having a dialogue stem, a music stem, and a sound effects stem.

System 400 may include a metadata extraction component 410, an audio feature extraction component 420, analysis component 430, digital signal processing (DSP) component, post-analysis component 450, post-processing component 460, audio features library 470, and previous analyses component 480. One or more components of system 400 may be implemented as a software package including executable machine readable instructions. In implementations, system 400 may correspond to a producer or distributor of media content.

Metadata extraction component 410 may be a component for extracting metadata categorizing the type of content associated with input sound mix 401. For example, metadata categorizing whether input sound mix 401 is associated with a particular production studio, genre, filmmaker, etc. may be extracted. Metadata extraction component 410 may also be a component for extracting metadata categorizing the type/format of input sound mix 401 (e.g., DOLBY ATMOS theater, DOLBY ATMOS home, 5.1, 7.1, Stereo, Binaural, etc.). In some implementations, metadata extraction component 410 may also be comprised of components for performing basic quality control for digital audio errors (corrupted bits/headers, technical saturation errors, etc.)

Audio feature extraction component 420 may be a component for extracting audio feature data identifying the audio characteristics of input sound mix 401. One or more of the following categories of audio feature data as described above may be extracted for input sound mix 401: (i) audio levels; (ii) audio spectral balance (e.g., frequency balance); (iii) audio spatial balance; and (iv) audio content identities. These audio features may be extracted in a manner similar to that described above with reference to operation 230.

The extracted metadata and audio feature data may be measured and cataloged into an audio features library 470 that includes training data for a model used to automatically generate derivative versions of sound mixes. For example, audio features library 470 may correspond to a database 310 as described above.

Analysis component 430 may be a component for applying one or more machine learned models (e.g., where the models were learned as described above with reference to methods 200-300) to the extracted metadata and audio feature data of input sound mix 401 to calculate audio features of a target version (e.g., derivative version) of the sound mix. The model may compare the extracted metadata and audio feature data with previous metadata and audio feature data analyzed by previous analyses component 480 and cataloged in audio features library 470. For example, given an input sound mix 401 in a DOLBY ATMOS theater format and a target sound mix in a DOLBY ATMOS home format, a model may be used to determine an appropriate mapping of audio feature data between the two formats. In some implementations, the audio feature data from audio features library 470 that is used for the comparison may be dependent on the desired audio format of the target version of the sound mix.

In some implementations, analysis component 430 may use the extracted metadata to select the type of machine learned model that is applied to the extracted audio feature data of input sound mix 401. For example, different models may be applied depending on the production studio of input sound mix 401, the content type of sound mix 401 (e.g., animation vs. live action), or based on some other metadata associated with sound mix 401. In some implementations, analysis component 430 may select the type of model that is applied to the extracted audio feature data of input sound mix 401 depending on the audio format of the target version. For example, a different model may applied depending on whether the audio format of the target version includes stereo sound or surround sound. In some implementations, selection of a model from a set of different models may be based on a determination of the model having the lowest error score for one or more of the metadata for the sound mix 401. For example, a particular model may be selected because it has the lowest average error score for mixes having animation and stereo sound metadata.

DSP component 440 may be a component for generating a versioned sound mix given the calculated audio features of the target sound mix and the audio features of the input sound mix 401. For example, DSP component 440 may perform adjustment of the audio features of the input sound mix to generate the target sound mix. One or more, either static or dynamic, audio spatial adjustments, audio spectral adjustments, audio level adjustments, or other audio adjustments may be performed. By way of example, audio spatial adjustments may include one or more of a desired audio playback format (e.g., summing/upmixing), distributed spatial energy, apparent width of front soundstage, listener envelopment, correlation/decorrelation of content during summing/upmixing, psychoacoustic effect applications, etc. Audio spectral adjustments may include one or more of audio channel spectral balance, spatial spectral energy balance, discrete element spectral balance (e.g., dialogue EQ), bass management, etc. Audio level adjustments may include one or more of momentary and long term perceived loudness, dynamic range, element-specific loudness management and exclusion, etc.

Post-analysis component 450 may be a component for ingesting the audio features created for the newly-generated version into audio features library 470 to further train/refine the machine learning model. In some implementations, post-analysis component 450 may provide an interface for a user to validate the newly-generated version and to provide additional feedback to tune the model.

Post processing component 460 may be a component for processing the newly-generated sound mix version to comply with technical version digital file specifications. For example, the newly-generated sound mix version may be processed to adjust/set a broadcast transmission peak level, a film leader/pop, bars and tone, timecode offset(s), naming, reel joining, etc.

Figure 7:
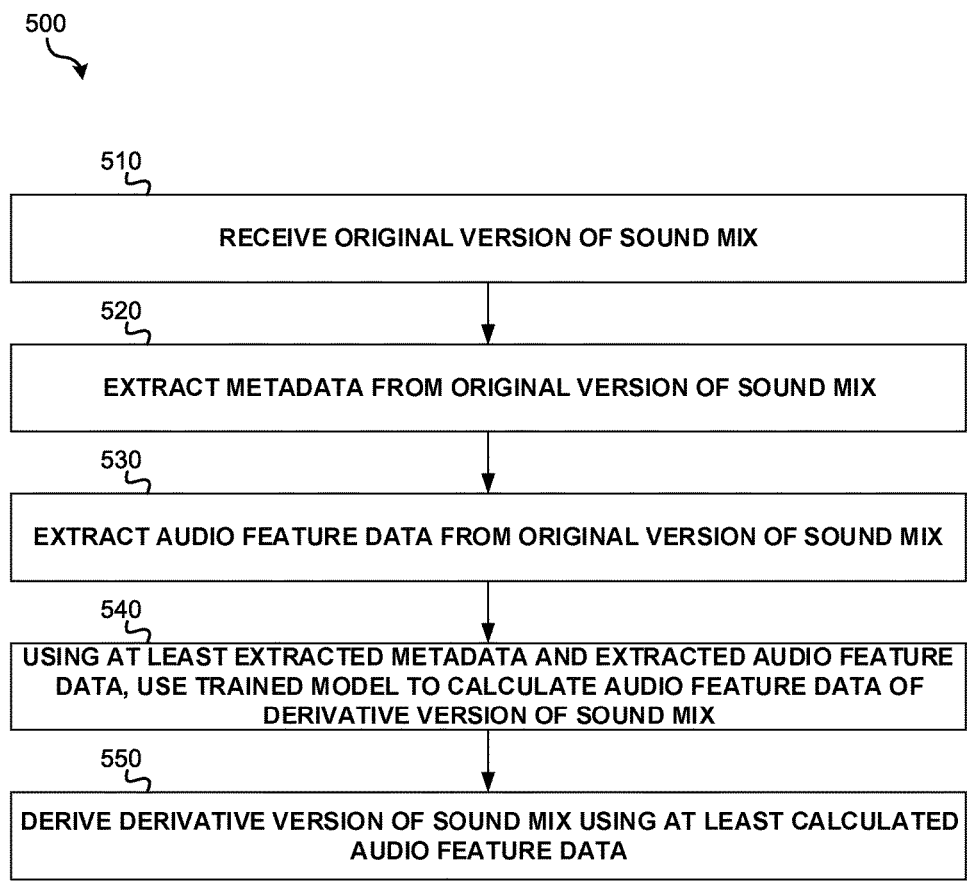
FIG. 7 is an operational flow diagram illustrating an example method of deriving a sound mix given an original sound mix, in accordance with implementations of the disclosure.

FIG. 7 is an operational flow diagram illustrating an example method 500 of deriving a derivative version of a sound mix given an original version of a sound mix, in accordance with implementations of the disclosure. In implementations, method 500 may be performed by sound mix versioning system 400 (e.g., by executing machine readable instructions stored in a memory). Although method 500 is described with reference to creating one derivative version of a sound mix, it should be appreciated that method 500 may be applied to generate multiple derivative versions of sound mixes (e.g., sound mixes in different audio formats).

At operation 510, an original version of a sound mix is received. For example, an original version of a sound mix created for a film or show may be ingested by a sound mix versioning system 400. At operation 520, metadata is extracted from the original version of the sound mix to categorize the type of content associated with the original sound mix. For example, a metadata extraction component 410 may be used to extract metadata categorizing the sound mix by production studio, genre, filmmaker, etc. Additionally, metadata may be extracted at operation 520 to categorize the type/audio format of the input sound mix.

At operation 530, audio feature data is extracted from the original version of the sound mix. For example, an audio feature extraction component 420 may be used to extract one or more of the following categories of audio feature data: (i) audio levels; (ii) audio spectral balance (e.g., frequency balance); (iii) audio spatial balance; and (iv) audio content identities.

At operation 540, using at least the extracted metadata and extracted audio feature data, a trained model may be used to calculate audio feature data of a derivative version of the sound mix to be derived. For example, an analysis component 430 may be used to apply one or more machine learned models to the extracted metadata and audio feature data to calculate audio features of a target version (e.g., derivative version) of the sound mix. In some implementations, a trained model may be selected to calculate audio feature data using at least the extracted metadata. For example, depending on a genre, studio, filmmaker, or other category of the original sound mix, one of a plurality of trained models may be selected. In some implementations, the audio format of the derivative version of the sound mix to be derived may also be used to determine what trained model to use to calculate the audio feature data.

In some implementations of operation 540, additional sound files 405 may be used to derive the sound mix. For example, in implementations where a foreign language sound mix is derived, a foreign language dialogue stem may be used to derive the sound mix.

At operation 550, using at least the calculated audio feature data, the derivative version of the sound mix may be derived. For example, a DSP component 440 may perform one or more of audio spatial adjustments, audio spectral adjustments, and audio level adjustment to the audio feature data of the original sound mix to derive the derivative version of the sound mix. These adjustments may result in amplitude adjustments, frequency adjustments, and/or phase adjustments to all or a subset of a digital audio waveform corresponding to the audio feature data of the original sound mix.

By way of example, an audio level increase may increase an amplitude of a digital audio waveform corresponding to the audio feature data. For instance, if an original sound mix is used to derive a particular format of sound mix that typically requires (e.g., as determined by training data) raising the volume of dialogue relative to background music as compared with other formats of sound mixes to make the dialogue clear, a dialogue stem of an original sound mix may be modified to increase the amplitude of a digital audio waveform corresponding to the dialogue stem of the original sound mix. As another example, an audio spatial adjustment that downmixes a sound mix into fewer channels (e.g., to derive a stereo sound mix from a 5.1 sound mix) may transform a source waveform corresponding to original sound mix into multiple waveforms.

Following derivation of the sound mix version at operation 550, additional post-processing operations may be performed. For example, in some implementations, the derived sound mix may be validated by a user (e.g., using post-analysis component 450) and adjusted as needed. Additionally, metadata and audio feature data of the derived sound mix may be imported into an audio features library along with metadata and audio feature data of the original sound mix to expand the training dataset of the machine learning model.

In some implementations, the newly-generated sound mix version may be further processed to comply with technical version digital file specifications (e.g., as described above with reference to post processing component 460).

Figure 8:
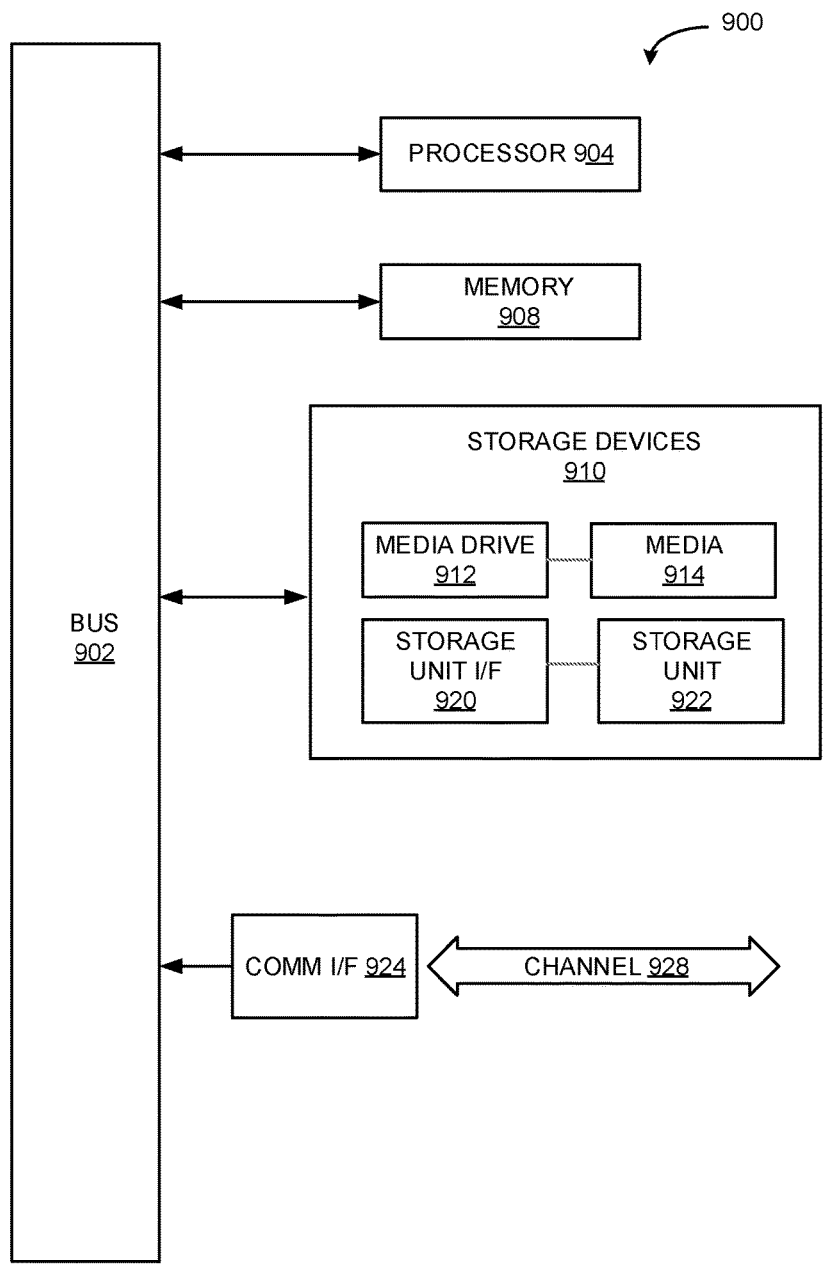
FIG. 8 illustrates an example computing component that may be used to implement various features of the methods disclosed herein.

FIG. 8 illustrates an example computing component that may be used to implement various features of the methods disclosed herein.

As used herein, the term component might describe a given unit of functionality that can be performed in accordance with one or more implementations of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

FIG. 8 illustrates an example computing component 900 that may be used to implement various features of the methods disclosed herein. Computing component 900 may represent, for example, computing or processing capabilities found within desktops and laptops; hand-held computing devices (tablets, smartphones, etc.); mainframes, supercomputers, workstations or servers; or any other type of special-purpose or general-purpose computing devices as may be desirable or appropriate for a given application or environment. Computing component 900 may also represent computing capabilities embedded within or otherwise available to a given device.

Computing component 900 might include, for example, one or more processors, controllers, control components, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory components, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, an optical disk drive, a CD, DVD, or BLU-RAY drive (R or RW), or other removable or fixed media drive might be provided. Accordingly, storage media 914 might include, for example, a hard disk, a solid state drive, cartridge, optical disk, a CD, a DVD, a BLU-RAY, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 908, storage unit 922, and media 914. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein. For example, execution of such instructions many enable computing component 900 to perform methods 200, 300, and/or 500.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply at the functionality described or claimed as part of the component are all configured in a common package. Indeed, any or all of the various parts of a component, whether control logic or other parts, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method, comprising:
   receiving a first version of a sound mix;
   extracting metadata from the first version of the sound mix, wherein the extracted metadata categorizes the first version of the sound mix;
   extracting audio feature data from the first version of the sound mix;
   automatically calculating, with a trained model, audio feature data of a second version of the sound mix using at least the extracted metadata and the extracted audio feature data of the first sound mix; and
   deriving the second version of the sound mix using at least the calculated audio feature data.

2. The method of claim 1, wherein the extracted audio feature data of the first version of the sound mix comprises one or more of: audio levels, audio spectral balance, audio spatial balance, and audio content identities.

3. The method of claim 2, wherein the extracted metadata identifies one or more of the following categories: a production studio, a genre, a filmmaker, a type of media content, a sound designer, a re-recording mixer, and a sound format of the first version of the sound mix.

4. The method of claim 3, wherein automatically calculating, with a trained model, audio feature data of a second version of the sound mix, comprises: selecting the trained model from a plurality of trained models based on at least a category of the first version of the sound mix identified from the extracted metadata.

5. The method of claim 2, wherein the first version of the sound mix is an original sound mix created for a television or film production, wherein the original sound mix comprises a dialogue stem, a music stem, and a sound effects stem, and wherein the second version of the sound mix comprises a dialogue stem, a music stem, and a sound effects stem.

6. The method of claim 2, wherein automatically calculating audio feature data of the second version of the sound mix comprises: the trained model using at least an audio format of the first version of the sound mix and a desired audio format of the second version of the sound mix to map one or more of the audio levels, audio spectral balance, audio spatial balance, and audio content identities of the first sound mix to a respective one or more of an audio level, audio spectral balance, audio spatial balance, and audio content identity of the second sound mix.

7. The method of claim 6, wherein deriving the second version of the sound mix comprises: using at least the calculated audio feature data of the second version of the sound mix to adjust one or more of the audio levels, audio spectral balance, audio spatial balance, and audio content identities of the first version of the sound mix.

8. The method of claim 6, further comprising: creating the trained model, wherein creating the trained model comprises:
  using a plurality of previously created sound mixes to create a first dataset comprising extracted metadata and extracted audio feature data for each of the previously created sound mixes;
  dividing the first dataset into a training dataset and a testing dataset, wherein each of the training dataset and testing dataset comprise a plurality of sound mix groups, each of the plurality of sound mix groups comprising extracted metadata and audio feature data of an original sound mix and derivative sound mixes derived from the original sound mix;
  training the model using the training dataset, wherein the model is trained using at least a supervised learning algorithm that correlates an audio feature of an original sound mix with an audio feature of a derivative sound mix; and
  testing the model using the testing dataset.

9. The method of claim 6, further comprising: ingesting audio features of the first and second versions of the sound mix into an audio features library to further train the learned model.

10. The method of claim 6, further comprising: applying additional processing to the derived second version of the sound mix to comply with technical version digital file specifications.

11. The method of claim 1, further comprising: distributing over a communication medium the derived second version of the sound mix as part of a digital media package.

12. A non-transitory computer-readable medium having executable instructions stored thereon that, when executed by a processor, performs operations of:
  receiving a first version of a sound mix;
  extracting metadata from the first version of the sound mix, wherein the extracted metadata categorizes the first version of the sound mix;
  extracting audio feature data from the first version of the sound mix;
  automatically calculating, with a trained model, audio feature data of a second version of the sound mix using at least the extracted metadata and the extracted audio feature data of the first sound mix; and
  deriving the second version of the sound mix using at least the calculated audio feature data.

13. The non-transitory computer-readable medium of claim 12, wherein the extracted audio feature data of the first version of the sound mix comprises one or more of: audio levels, audio spectral balance, audio spatial balance, and audio content identities.

14. The non-transitory computer-readable medium of claim 13, wherein the extracted metadata identifies one or more of the following categories: a production studio, a genre, a filmmaker, a type of media content, a sound designer, a re-recording mixer, and a sound format of the first version of the sound mix.

15. The non-transitory computer-readable medium of claim 14, wherein automatically calculating, with a trained model, audio feature data of a second version of the sound mix, comprises: selecting the trained model from a plurality of trained models based on at least a category of the first version of the sound mix identified from the extracted metadata.

16. The non-transitory computer-readable medium of claim 13, wherein the first version of the sound mix is an original sound mix created for a television or film production, wherein the original sound mix comprises a dialogue stem, a music stem, and a sound effects stem, and wherein the second version of the sound mix comprises a dialogue stem, a music stem, and a sound effects stem.

17. The non-transitory computer-readable medium of claim 13, wherein automatically calculating audio feature data of the second version of the sound mix comprises: the trained model using at least an audio format of the first version of the sound mix and a desired audio format of the second version of the sound mix to map one or more of the audio levels, audio spectral balance, audio spatial balance, and audio content identities of the first sound mix to a respective one or more of an audio level, audio spectral balance, audio spatial balance, and audio content identity of the second sound mix.

18. The non-transitory computer-readable medium of claim 17, wherein deriving the second version of the sound mix comprises: using at least the calculated audio feature data of the second version of the sound mix to adjust one or more of the audio levels, audio spectral balance, audio spatial balance, and audio content identities of the first version of the sound mix.

19. The non-transitory computer-readable medium of claim 12, wherein the instructions, when executed by the processor, further perform an operation of creating the trained model, wherein creating the trained model comprises:
  using a plurality of previously created sound mixes to create a first dataset comprising extracted metadata and extracted audio feature data for each of the previously created sound mixes;

dividing the first dataset into a training dataset and a testing dataset, wherein each of the training dataset and testing dataset comprise a plurality of sound mix groups, each of the plurality of sound mix groups comprising extracted metadata and audio feature data of an original sound mix and derivative sound mixes derived from the original sound mix;

training the model using the training dataset, wherein the model is trained using at least a supervised learning algorithm that correlates an audio feature of an original sound mix with an audio feature of a derivative sound mix; and testing the model using the testing dataset.

20. The non-transitory computer-readable medium of claim 12, wherein the instructions, when executed by the processor, further perform an operation of: ingesting audio features of the first and second versions of the sound mix into an audio features library to further train the learned model.

21. A system, comprising:

a processor; and a non-transitory computer-readable medium having executable instructions stored thereon that, when executed by the processor, performs operations of:

receiving a first version of a sound mix;

extracting metadata from the first version of the sound mix, wherein the extracted metadata categorizes the first version of the sound mix;

extracting audio feature data from the first version of the sound mix;

automatically calculating, with a trained model, audio feature data of a second version of the sound mix using at least the extracted metadata and the extracted audio feature data of the first sound mix; and deriving the second version of the sound mix using at least the calculated audio feature data.

* * * * *